United States Patent
Fitzgerald et al.

(10) Patent No.: US 10,033,179 B2
(45) Date of Patent: Jul. 24, 2018

(54) METHOD OF AND APPARATUS FOR PROTECTING A SWITCH, SUCH AS A MEMS SWITCH, AND TO A MEMS SWITCH INCLUDING SUCH A PROTECTION APPARATUS

(71) Applicant: Analog Devices Global Unlimited Company, Hamilton (BM)

(72) Inventors: Padraig L. Fitzgerald, Mallow (IE); Eric James Carty, Limerick (IE)

(73) Assignee: Analog Devices Global Unlimited Company, Hamilton (BM)

( * ) Notice: Subject to any disclaimer, the term of this patent is extended or adjusted under 35 U.S.C. 154(b) by 278 days.

(21) Appl. No.: 14/743,396

(22) Filed: Jun. 18, 2015

(65) Prior Publication Data
US 2016/0006241 A1    Jan. 7, 2016

Related U.S. Application Data

(60) Provisional application No. 62/020,156, filed on Jul. 2, 2014.

(51) Int. Cl.
*H02H 9/04* (2006.01)
*H01H 59/00* (2006.01)
(Continued)

(52) U.S. Cl.
CPC .......... *H02H 9/04* (2013.01); *H01H 59/0009* (2013.01); *H01H 9/542* (2013.01); *H01H 9/547* (2013.01); *H01H 2061/006* (2013.01)

(58) Field of Classification Search
CPC .......... H02H 9/04; H01H 9/542; H01H 9/547; H01H 2061/006
See application file for complete search history.

(56) References Cited

U.S. PATENT DOCUMENTS 4,550,356 A * 10/1985 Takahashi ............ H01H 33/161
361/11
4,740,858 A * 4/1988 Yamaguchi .......... H01H 33/596
361/3
(Continued)

FOREIGN PATENT DOCUMENTS

CN          101227185 A      7/2008    ......... H03K 17/0814
CN          102730620 A      10/2012   ............... B81B 7/00
(Continued)

OTHER PUBLICATIONS

International Searching Authority, International Search Report—International Application No. PCT/US2006/026230, dated Dec. 4, 2006, together with the Written Opinion of the International Searching Authority, 10 pages.

*Primary Examiner* — Zeev V Kitov
(74) *Attorney, Agent, or Firm* — Wolf, Greenfield & Sacks, P.C.

(57) ABSTRACT

A method of and apparatus for protecting a MEMS switch is provided. The method and apparatus improve the integrity of MEMS switches by reducing their vulnerability to current flow through them during switching of the MEMS switch between on and off or vice versa. The protection circuit provides for a parallel path, known as a shunt, around the MEMS component. However, components within the shunt circuit can themselves be removed from the shunt when they are not required. This improves the electrical performance of the shunt when the switch is supposed to be in an off state.

33 Claims, 11 Drawing Sheets

(51) Int. Cl.
*H01H 9/54* (2006.01)
*H01H 61/00* (2006.01)

(56) References Cited

U.S. PATENT DOCUMENTS

| | | | |
|---|---|---|---|
| 4,831,487 A * | 5/1989 | Ruoss | H01H 33/161 |
| | | | 361/111 |
| 4,959,746 A | 9/1990 | Hongel | 361/13 |
| 6,054,659 A | 4/2000 | Lee et al. | 200/181 |
| 6,232,847 B1 | 5/2001 | Marcy, V et al. | 331/167 |
| 6,690,178 B2 * | 2/2004 | Harris | G01R 31/2621 |
| | | | 324/109 |
| 6,798,321 B2 | 9/2004 | Hallbjorner | 335/78 |
| 6,806,482 B2 | 10/2004 | Yamagishi | 250/551 |
| 6,884,950 B1 | 4/2005 | Nicholson et al. | 200/181 |
| 7,155,979 B2 | 1/2007 | Lasalandra et al. | 73/514.18 |
| 7,633,095 B1 * | 12/2009 | Kerr | H01L 29/1045 |
| | | | 257/133 |
| 7,643,256 B2 | 1/2010 | Wright et al. | 361/8 |
| 7,737,810 B2 | 6/2010 | Chan et al. | 335/78 |
| 7,864,491 B1 * | 1/2011 | Bauder | H01H 9/30 |
| | | | 361/13 |
| 8,154,365 B2 | 4/2012 | Chan et al. | 335/78 |
| 8,638,093 B2 | 1/2014 | Aimi et al. | 324/300 |
| 2004/0113713 A1 | 6/2004 | Zipper et al. | 333/103 |
| 2004/0152276 A1 | 8/2004 | Nishimura | 438/365 |
| 2006/0269186 A1 | 11/2006 | Frame et al. | 385/12 |
| 2007/0139145 A1 | 6/2007 | Subramanian et al. | 335/78 |
| 2008/0007888 A1 | 1/2008 | Morris, III et al. | 361/281 |
| 2008/0093685 A1 | 4/2008 | Watanabe et al. | 257/415 |
| 2014/0126098 A1 * | 5/2014 | Sarrus | H02H 3/20 |
| | | | 361/91.5 |

FOREIGN PATENT DOCUMENTS

| | | | |
|---|---|---|---|
| EP | 0978893 A2 | 2/2000 | H01P 1/12 |
| JP | 2000-57927 A | 2/2000 | H01H 59/00 |
| JP | 2004-173257 A | 6/2004 | H03K 17/78 |
| JP | 2004-221285 A | 8/2004 | H01L 49/00 |
| WO | WO 99/19974 A2 | 4/1999 | |
| WO | WO 2004/061882 A1 | 7/2004 | H01H 1/00 |

* cited by examiner

METHOD OF AND APPARATUS FOR PROTECTING A SWITCH, SUCH AS A MEMS SWITCH, AND TO A MEMS SWITCH INCLUDING SUCH A PROTECTION APPARATUS

CROSS REFERENCE TO RELATED APPLICATIONS

This patent application claims priority from provisional U.S. patent application No. 62/020,156, filed Jul. 2, 2014, entitled, "Method of and Apparatus for Protecting a Switch, Such as a MEMS Switch, and to a MEMS Switch Including Such a Protection Apparatus," and naming Padraig L. Fitzgerald as inventor [practitioner's file 2906/143], the disclosure of which is incorporated herein, in its entirety, by reference.

TECHNICAL FIELD

This disclosure relates to methods of and apparatus for protecting a MEMS switch during its operation, and to a MEMS switch including such a protection method and apparatus.

BACKGROUND ART

MEMS switches are gaining popularity as reliable small size switching alternatives to relays and field effect transistors. MEMS switches are exceedingly small, have a low insertion loss, and a high impedance when in the open state. However, in general, MEMS switches are only operated to change state between open and closed or vice versa when there is no current flowing through the switch or no voltage across the switch. This is to avoid arcing within the MEMS switch which can damage the material of the switch contacts. The dimensions of MEMS switches are, as noted above, very small, with the contacts often being only separated by a micron or so when in the open position. Arcing can cause the profile of the switch to change in such a way that the switch could become permanently conducting, or to damage the contacts such that it becomes permanently open circuit.

SUMMARY OF THE EMBODIMENTS

It would be desirable to facilitate the use of MEMS switches across a greater range of a devices and applications. In order to do this, the potential issues associated with damage during opening and closing of the switch would benefit from being addressed.

This disclosure relates to a method of protecting a switch. The protection is implemented during the opening and closing operations of the switch. The protection comprises providing a controllable shunt path in parallel with the switch. The shunt path can be operated to provide a current flow path in parallel with the switch during the opening and closing operations of the switch. Advantageously the shunt path comprises at least one solid state switch, such as a transistor, in series with at least one mechanical switch.

Preferably the switch is a MEMS switch. The MEMS switch may be provided within an integrated circuit package. Advantageously the at least one mechanical switch is a further MEMS switch. As a result a physically small combination can still be provided. In use, the at least one mechanical switch can be operated to disconnect the solid state switch from the shunt path when it is not required. As a result parasitic components associated with the solid state switch can be removed from the circuit, thereby giving rise to better off state performance.

This disclosure also relates to a method of protecting a MEMS switch where a shunt path is provided in parallel with the MEMS switch. The shunt path comprises at least one further MEMS switch. The at least one further MEMS switch may be provided in parallel with a further shunt (which may be a passive component or an active component), so as to limit voltage variation across the at least one further MEMS switch, and/or in association with a current limiting component, such as a resistance, for example in the form of a resistor, a transistor, or a combination of components.

This disclosure further relates to a MEMS switch having a first switch node and a second switch node. The MEMS switch is provided in association with a protection circuit. The protection circuit is arranged to selectively provide a low impedance path between the first and second switch nodes of the MEMS switch. The protection circuit comprises a first protection circuit MEMS switch, and components for limiting a voltage across or current through the first protection MEMS switch around a switch transition of the first protection circuit MEMS switch.

In a further aspect of this disclosure, a protection circuit is provided in which one or more inductors are provided to reduce high frequency signal propagation through a shunt transistor. The inductor(s) and shunt transistor form a controllable shunt path having a high-stop filter characteristic. This reduces signal propagation of high frequency signals through the shunt path.

The protection circuits may be provided on the same substrate or die as the MEMS switch. Alternatively the protection circuit may be provided partially or wholly on a further die or substrate, and wire bonds or other interconnection structures may be provided to link the protection circuit with the switch.

Active components, such as amplifiers, may be used to temporarily drive the voltages on either side of one or more switches in the protection circuit to substantially the same value so as to reduce switching stress on those switches.

BRIEF DESCRIPTION OF THE DRAWINGS

Embodiments of this disclosure will now be described, by way of example only, with reference to the accompanying figures, in which.

DETAILED DESCRIPTION OF SPECIFIC EMBODIMENTS

Figure 1:
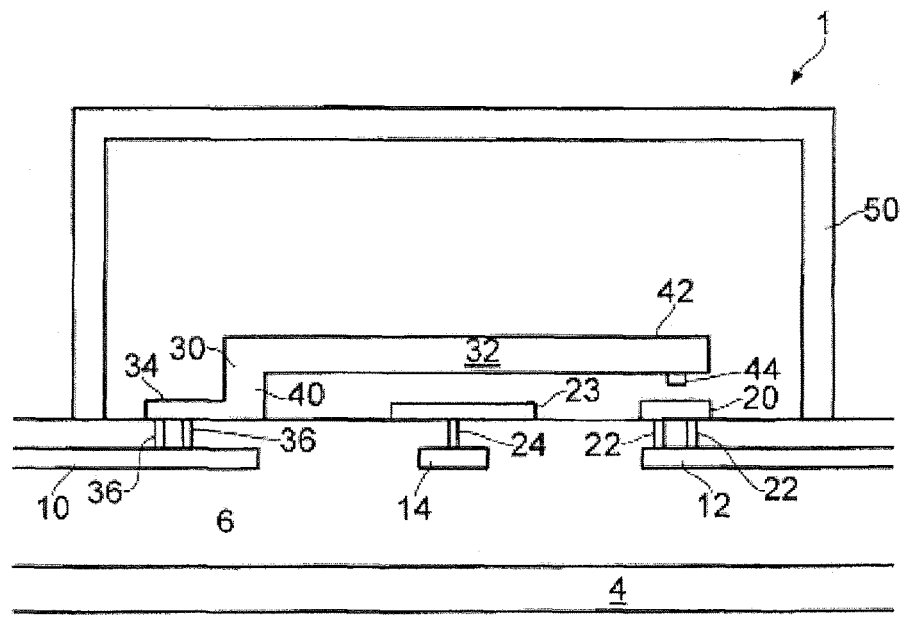
FIG. 1 is a cross-section through a MEMS switch.

FIG. 1 is a schematic diagram of an embodiment of a MEMS (micro-electro-mechanical system) switch generally indicated 1. This description of a MEMS switch is given by way of background only and is not intended to limit the teachings of this disclosure to the particular MEMS switch configuration. The switch 1 is formed over a substrate 2. The substrate 2 may be a semiconductor, such as silicon. The silicon substrate may be a wafer formed by processes such as the Czochralski, CZ, process or the float zone process. The CZ process is less expensive and gives rise to a silicon substrate which is more physically robust than that obtained using the float zone process, but float zone delivers silicon with a higher resistivity which is more suitable for use in high frequency circuits.

The silicon substrate may optionally be covered by a layer 4 of undoped polysilicon. The layer 4 of polysilicon acts as a carrier lifetime killer. This enables the high frequency performance of the CZ silicon to be improved.

A dielectric layer 6, which may be of silicon oxide (generally $SiO_2$) is formed over the substrate 2 and the optional polysilicon layer 4. The dielectric layer 6 may be formed in two phases such that a metal layer may be deposited, masked and etched to form conductors 10, 12 and 14. Then the second phase of deposition of the dielectric 6 may be performed so as to form the structure shown in FIG. 1 in which the conductors 10, 12 and 14 are embedded within the dielectric layer 6.

The surface of the dielectric layer 6 has a first switch contact 20 provided by a relatively hard wearing conductor formed over a portion of the layer 6. The first switch contact 20 is connected to the conductor 12 by way of one or more vias 22. Similarly a control electrode 23 may be formed above the conductor 14 and be electrically connected to it by one or more vias 24.

A support 30 for a switch member 32 is also formed over the dielectric layer 6. The support 30 comprises a foot region 34 which is deposited above a selected portion of the layer 6 such that the foot region 34 is deposited over the conductor 10. The foot region 34 is connected to the conductor 10 by way of one or more vias 36.

In a typical MEMS switch the conductors 10, 12 and 14 may be made of a metal such as aluminum or copper. The vias may be made of aluminum, copper, tungsten or any other suitable metal or conductive material. The first switch contact 20 may be any suitable metal, but rhodium is often chosen as it is hard wearing. For ease of processing the control electrode may be made of the same material as the first switch contact 20 or the foot region 34. The foot region 34 may be made of a metal, such as gold.

The support 30 further comprises at least one upstanding part 40, for example in the form of a wall or a plurality of towers that extends away from the surface of the dielectric layer 6.

The switch member 32 forms a moveable structure that extends from an uppermost portion of the upstanding part 40. The switch member 32 is typically (but not necessarily) provided as a cantilever which extends in a first direction, shown in FIG. 1 as direction A, from the support 30 towards the first switch contact 20. An end portion 42 of the switch member 20 extends over the first switch contact 32 and carries a depending contact 44. The upstanding part 40 and the switch member 32 may be made of the same material as the foot region 34.

The MEMS structure, in this example, is protected by a cap structure 50 which is bonded to the surface of the dielectric layer 6 or other suitable structure so as to enclose the switch member 32 and the first switch contact 20. Suitable bonding techniques are known to the person skilled in the art.

As noted before, the teachings of this disclosure are not limited to use with any particular MEMS switch design. Thus the teachings are equally, for example, appropriate for use with see-saw (or teeter-totter) switch designs.

The switch 1 can be used to replace relays and solid state transistor switches, such as FET switches. Many practitioners in the field have adopted a terminology that is used with FETs. Thus the conductor 10 may be referred to as a source, the conductor 12 may be referred to as a drain, and the conductor 23 forms a gate connected to a gate terminal 14. The source and drain may be swapped without affecting the operation of the switch.

In use a drive voltage is applied to the gate 23 from a drive circuit connected to the gate terminal. The potential difference between the gate 23 and the switch member 32 causes, for example, positive charge on the surface of the gate 23 to attract negative charge on the lower surface of the movable switch member 32. This causes a force to be exerted that pulls the switch member 32 towards the substrate 2. This force causes the switch member to bend such that the depending contact 44 contacts the first switch contact 20.

In practice, the switch is over driven so as to hold the contact 44 relatively firmly against the first switch contact 20.

Figure 2:
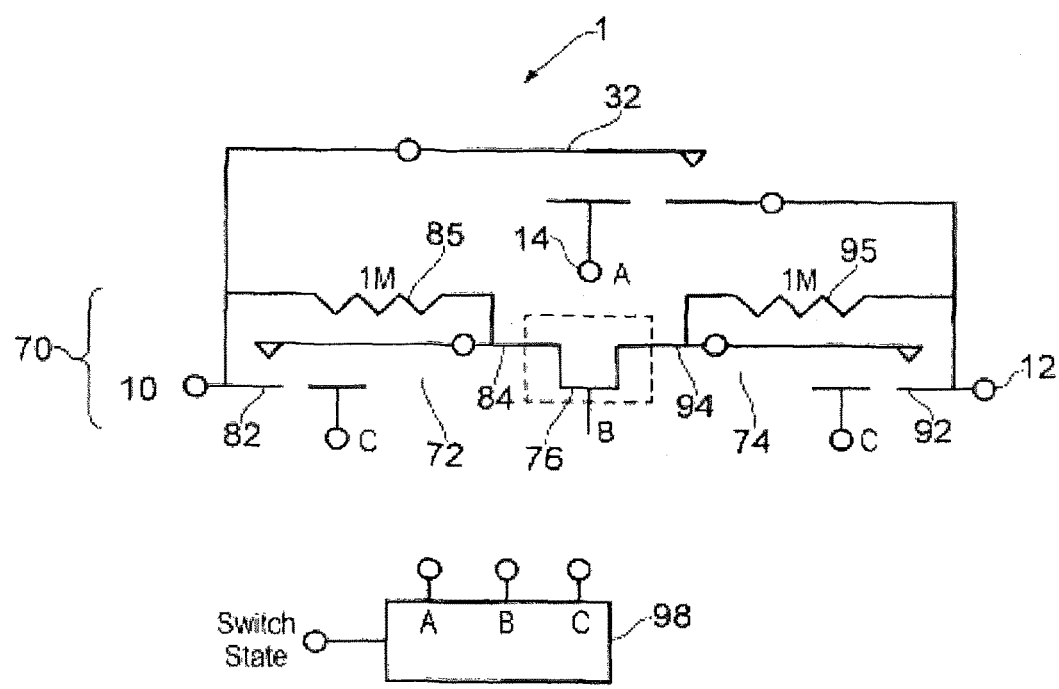
FIG. 2 is a circuit diagram of a MEMS switch in association with a protection circuit.

Such a MEMS switch may have its performance degraded if it is switched whilst a voltage exists across it or a current flows through it. This problem has been recognized in the past, and workers in this field have sought to address this by providing a solid state switch in parallel with the MEMS switch 1. Whilst such solid state switches are advantageous in protecting the MEMS switch, they may have the undesirable consequence of introducing a relatively large parasitic capacitance. One of the known advantages of MEMS switches is their high isolation when in the off (i.e. open) switch state. The provision of a parallel semiconductor switch, such as a MOSFET, exhibiting parasitic capacitance provides a parasitic signal path around the switch which degrades its off state performance. The inventor realized that the off state performance could be restored by providing further means, for example further MEMS switches, which could be used to switch or more accurately disconnect the semiconductor switch from the terminals of the MEMS switch 1 when it was not needed to provide switch protection. Such an arrangement is schematically shown in FIG. 2, where the main switch component, designated 1 and described hereinbefore with respect to FIG. 1, provides a controllable switch path between first and second switch nodes 10 and 12 respectively. However, the switch 1 is further associated with a protection circuit 70 comprising a first protection circuit MEMS switch 72, a second protection circuit MEMS switch 74 and semi-conductor switch 76. The first protection circuit MEMS switch 72 has a first terminal 82 connected to the first switch node 10, and a second terminal 84 connected to a current flow node of the semiconductor switch 76. Where the semiconductor switch 76 is comprised of one or more FET devices, then the current flow terminal may be a drain or a source of the semiconductor switch. The first protection circuit MEMS switch 72 may, as shown in FIG. 2, have a shunt resistance 85 in parallel with it. The shunt resistance 85 may be a large value resistor in order to provide a small current path across the first protection circuit switch 72 in order that the voltage at either of its nodes or terminals 82 and 84 tends to equalize. The large resistor, for example 1 Mega-ohm as shown here, means that the parasitic leakage to the semiconductor switch 76 is very small. However, depending on the bandwidth and the performance of the circuits associated with the MEMS switch 1, a much smaller value resistor 85 may be provided.

Similarly, the second protection circuit MEMS switch 74 has a first terminal 92 connected to the second switch terminal 12, and a second terminal 94 connected to a second current flow terminal of the semiconductor switch 76 and may have a resistor 95 in parallel with it. Thus, when both the first and second protection circuit MEMS switches 72 and 74 are in a conducting state, and the semiconductor switch 76 is in a low impedance state then the protection circuit 70 forms a shunt between the switch nodes 10 and 12, thereby allowing the main switch 1 to be operated such that a signal can be applied to or removed from its gate 23 (FIG. 1) in order to cause the switch member 32 to move. In a variation the resistors 85 and 95 may be replaced by respective resistor and series transistor combinations. This allows the parallel resistance to be variable. If the resistors are connected to the switch nodes 10 and 12 then the parasitic components associated with the additional transistors are largely hidden from the nodes 10 and 12.

Figure 3:
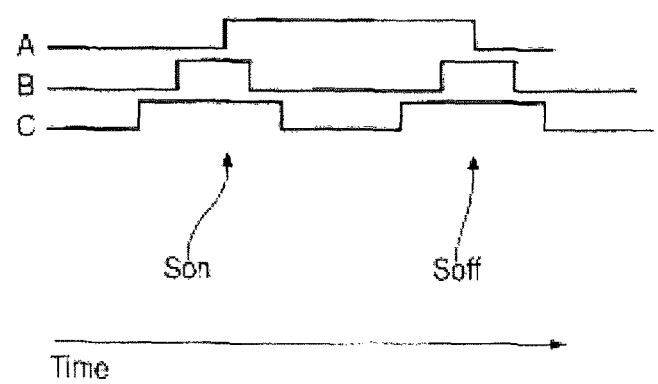
FIG. 3 is a timing diagram showing signals for the circuit of FIG. 2 during opening and closing operations of the MEMS switch.

FIG. 3 shows switch control signals labelled A, B and C which are applied to the gates of the first switch 1 and of the first and second protection circuit switches 72 and 74, and the gate or other control terminal of the semiconductor switch 76. As shown in FIG. 3, it is desired to switch the switch 1 on at time $S_{ON}$ and switch it off at time $S_{OFF}$. In advance of time $S_{ON}$, switch control signal C is asserted first. This causes the first and second protection circuit MEMS switches to close, thereby introducing the semiconductor switch 76 into the shunt path around the switch 1. As the semiconductor switch 76 is in a non-conducting state, no current flow should occur through the first and second protection circuit MEMS switches at this time and consequently they undergo no switching damage. Furthermore, the provision of the high impedance shunting resistors 85 means that there is no or very little parasitic capacitance to be charged at this time. Next the transistor switch 76 is turned on by asserting the signal B. Thus the shunt path connects nodes 10 and 12. After a suitable guard time signal A may be asserted in order to close the switch 1, then the signals B and C can be removed. As shown in FIG. 3 signal B is removed before signal C is de-asserted but other switching schemes are possible. When it is desired to switch the switch 1 off at time $S_{OFF}$, the process is repeated with signal C being asserted to close the first and second protection circuits MEMS switches prior to switching the semiconductor switch 76 into a conducting state. Once the shunt has been reestablished, then the signal A can be removed thereby allowing switch 1 to open. Then the transistor 76 is made high impedance by removing signal B, and once current flow has ceased the signal C is removed thereby opening the first and second protection circuit MEMS switches 72 and 74, respectively. The switch signals A, B and C may be provided by a switch controller 98, as shown in FIG. 2, in response to a "switch state" signal.

Figure 4:
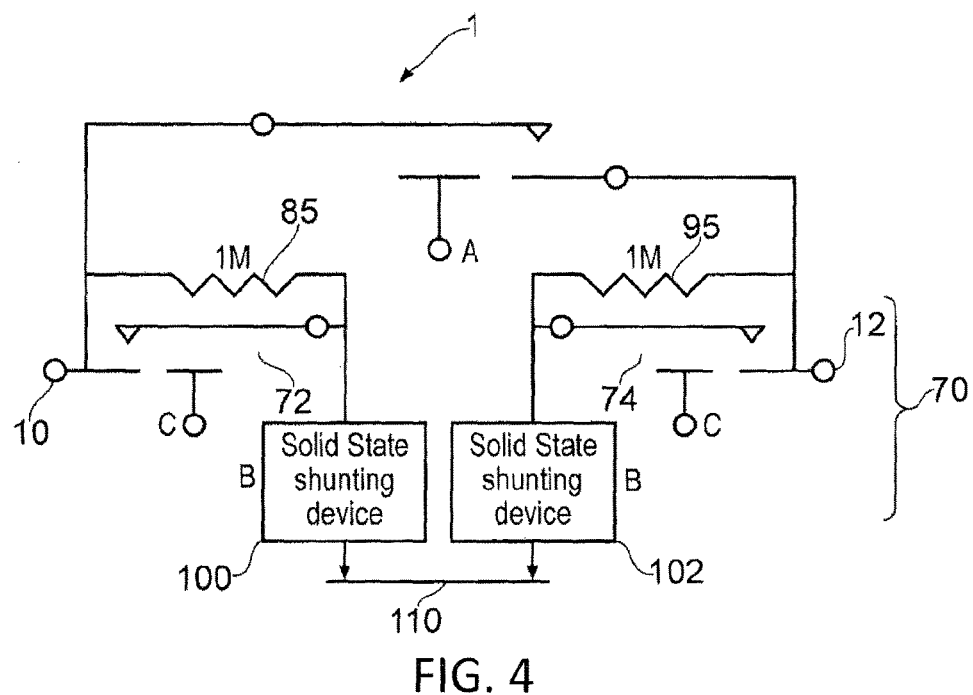
FIG. 4 shows a second embodiment of a protection circuit in association with a MEMS switch.

FIG. 4 shows a variation on the arrangement shown in FIG. 2. The first and second protection circuit MEMS switches 72 and 74 are still provided as described hereinbefore, and connected to nodes 10 and 12, respectively, but each protection circuit MEMS switch is now in series with a respective solid state switch 102 and 100 which connect to a common node 110. The switches 102 and 100 may form or be part of a semiconductor switch array. The semiconductor switches 100 and 102 can be FET based switches as described hereinbefore. As before, the first and second protection circuit MEMS switches 72 and 74 may be provided with respective shunt resistors 85. The shunt resistors may be a large value, as indicated in FIG. 4.

Figure 5:
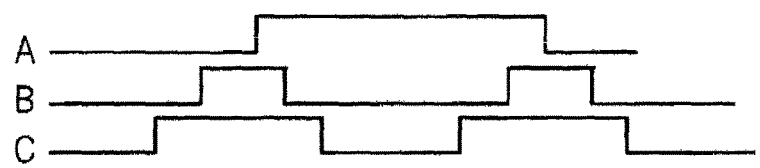
FIG. 5 shows timing diagrams for the arrangement of FIG. 4.

FIG. 5 shows a drive signal diagram for the arrangement shown in FIG. 4. It can be seen that the signals A, B and C can be asserted and de-asserted as previously described with respect to FIG. 3.

Figure 6:
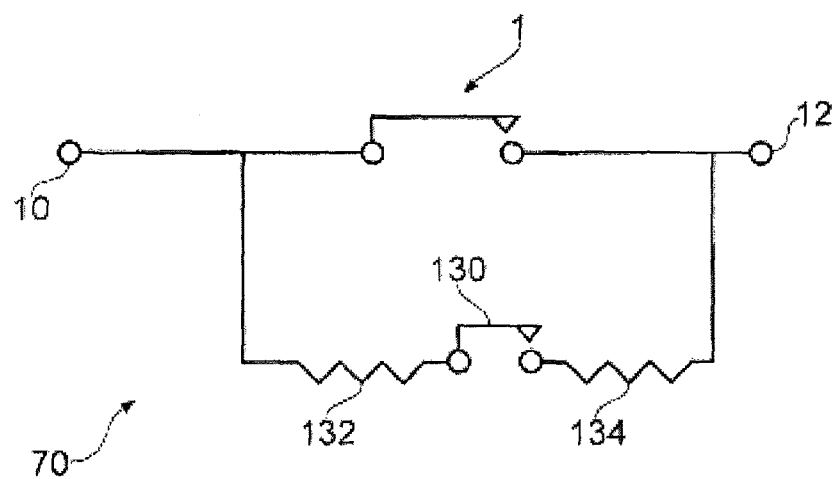
FIG. 6 shows a further embodiment of a protection circuit in association with a MEMS switch.

FIG. 6 shows a further embodiment of this disclosure in which the MEMS switch 1 extends between first and second switch terminals 10 and 12 as hereinbefore described. However, now only a single MEMS protection circuit switch 130 is provided in the protection circuit 70. The switch 130 may be similar or identical to the switch 1 or may be a smaller switch as it is relatively common to provide MEMS switches 1 with multiple switch contacts in order to keep the on state resistance low. The MEMS protection circuit switch 130 is connected in series with resistors 132 and 134 between the first and second switch nodes 10 and 12. The resistor values 132 and 134 need to be selected, based on the designer's knowledge of the voltage occurring between the nodes 10 and 12, in order to balance the need to form a low impedance shunt path using the components 130, 132 and 134 with avoiding transients at the switch 130 when it is operated. However, the resistors 132 and 134 act, together with parasitic capacitances associated with the switch 130, or actual capacitances which may be formed around it to dampen and reduce the magnitude of switching currents. The control scheme for this arrangement is similar to that described with respect to FIG. 3, except now signal B is no longer provided as there is no semi-conductor switch. Thus a control signal for the shunt switch is asserted in advance of changing the switching state of the main switch 1, and de-asserted after operating the switch 1.

Figure 7:
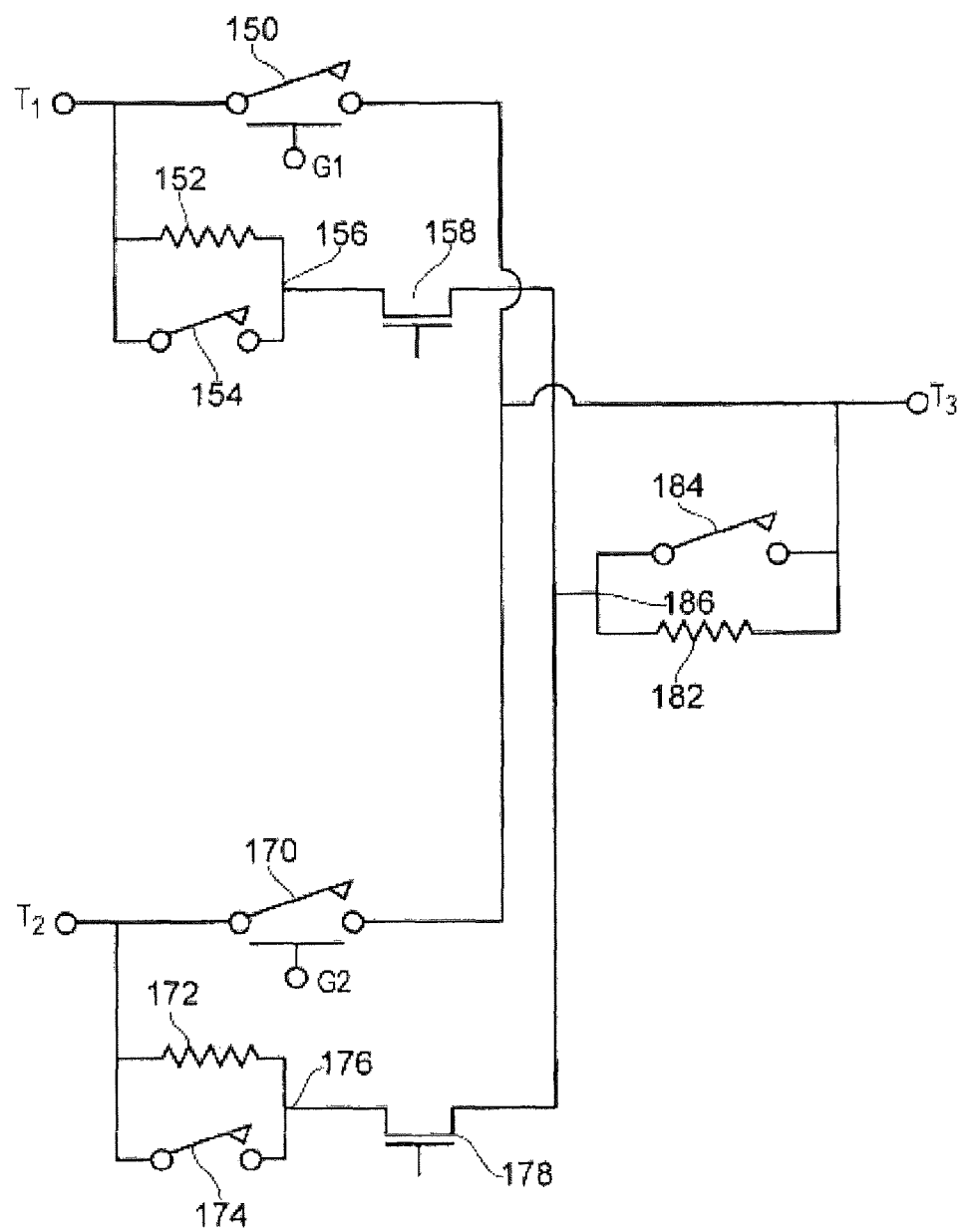
FIG. 7 shows a further embodiment of a switching network where one or more of a plurality of signals can be connected to an output node, a switching network being associated with a protection circuit.

The arrangement described herein can be used with multiple switches. FIG. 7 represents a situation in which two MEMS switches representing main switches of the type described hereinbefore with respect to FIG. 1 are designated 150 and 170. Each of the switches 150 and 170 can be opened and closed in response to respective switch control signals G1 and G2 provided to the gates of the first and second MEMS switches 150 and 170, respectively. The first of these switches 150 extends between a first input terminal designated T1 and an output terminal designated T3. The second switch 170 extends between a second input terminal designated T2 and the output terminal designated T3. It should be noted that any of these terminals might not be explicit terminals, and might merely represent circuit nodes, and any terminal could be swapped between input and output, or be bidirectional. T1 is connected to a first resistor 152 which is in parallel with a first protection MEMS switch 154 which in turn connect to a circuit node 156. A similar resistor 172 and switch 174 are provided in association with the second switch 170 and the second terminal T2. The resistor 172 and MEMS switch 174 form a path extending between the second terminal and a node 176. Furthermore the third terminal T3 is, in this example, connected to a further resistor 182 and a third protection MEMS switch 184. The resistor 182 and MEMS switch 164 form a path extending between the third terminal and a node 186. A first transistor 158 is connected between the nodes 156 and 186. A second transistor 178 is connected between the nodes 176 and 186. The transistor 158 and switches 154 and 184 can be controlled to provide a shunt path around the switch 150. Similarly the transistor 178 and switches 174 and 184 provide a controllable shunt path around the switch 170.

Figure 8:
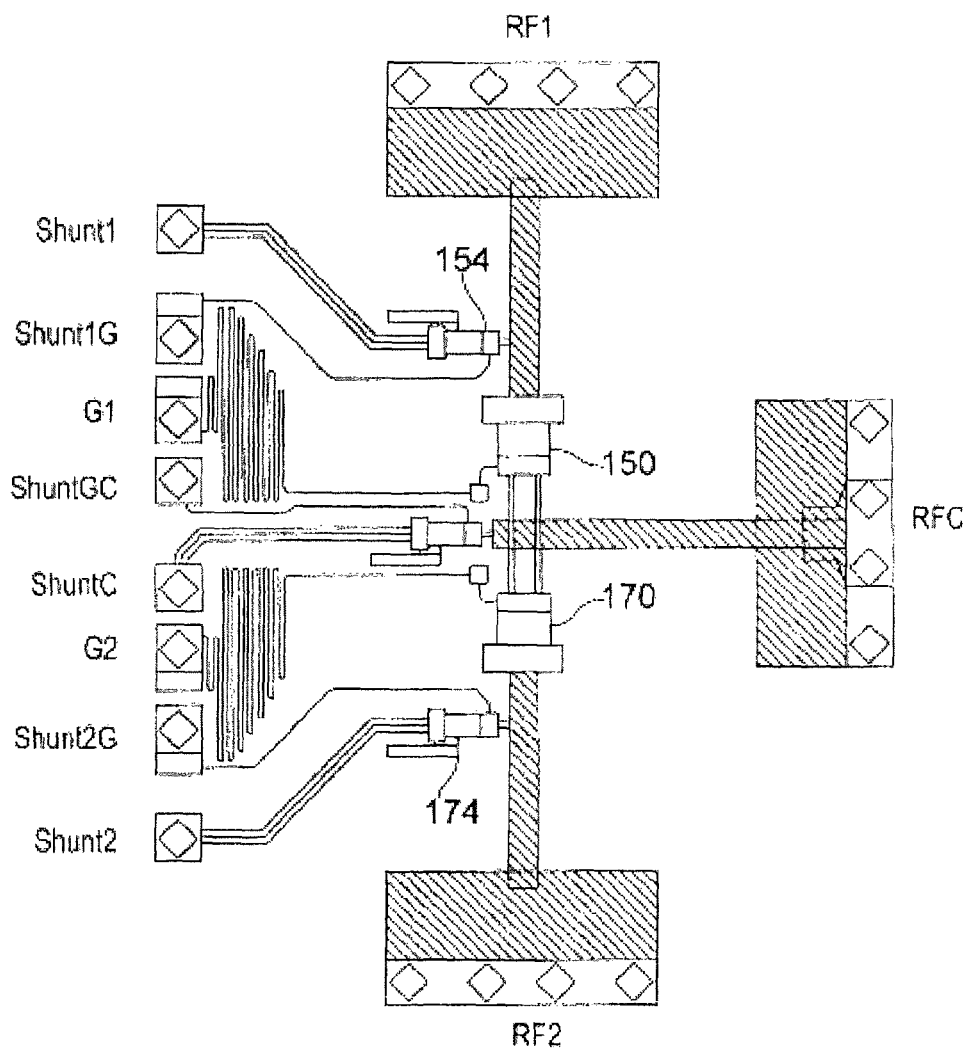
FIG. 8 shows a plan view of the switching network of FIG. 7 as implemented within an integrated circuit.

It might be thought that the resistors 152, 172 and 182 would have to be large value components as described hereinbefore, but this may not be the case. The resistors 152, 172 and 182 may be selected as terminating components in order to provide a suitable terminating impedance within an RF transmission line or other signal path. This could be achieved by providing one or more further transistors (not shown) to selectively connect nodes 156, 176 or 186 to a ground plane or signal line. Thus although the terminating impedance would vary depending on whether the switches are open or closed, it would not vary so substantially compared to if the resistors were not provided. Thus potential issues of signal reflection can be mitigated at the same time by providing signal termination. The operation of such additional transistors would need to be correctly phased to that of the protection switches and transistors 158 and 178. The resistors also allow parasitic capacitances to discharge. A plan view of the layout of such an arrangement as shown in FIG. 7 is shown in FIG. 8, although the components 182 and 184 have been omitted in this configuration.

Figure 9:
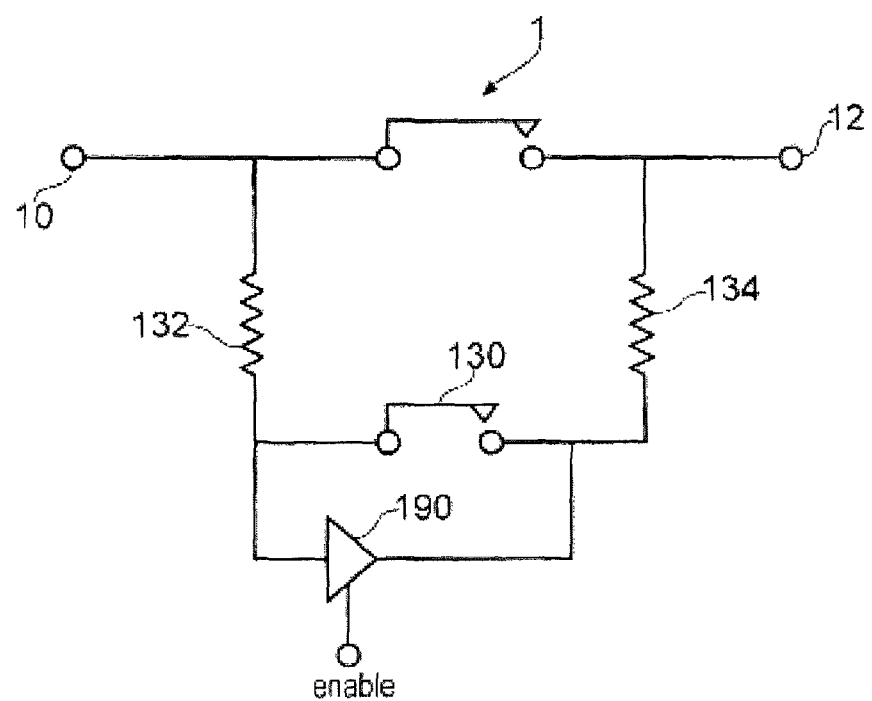
FIG. 9 shows a further embodiment of a switch and protection circuit.

It is further possible to provide an active component in order to drive the voltage across the main switch 1 or each protection switch in order to reduce the voltage difference across the switches. FIG. 9 shows a modification to the arrangement shown in FIG. 6 where an amplifier 190 is arranged to force the voltage across a switch 130 to a low value. This arrangement is based on the implicit knowledge that node 10 represents an input and node 12 represents an output. Active circuits, such the amplifier 190 could be provided in association with other ones of the embodiments. Thus, active circuits could be arranged to drive the voltage at node 12 to match that at node 10, and node 94 to match that at node 12 of the arrangement as shown in FIG. 2.

Figure 10:
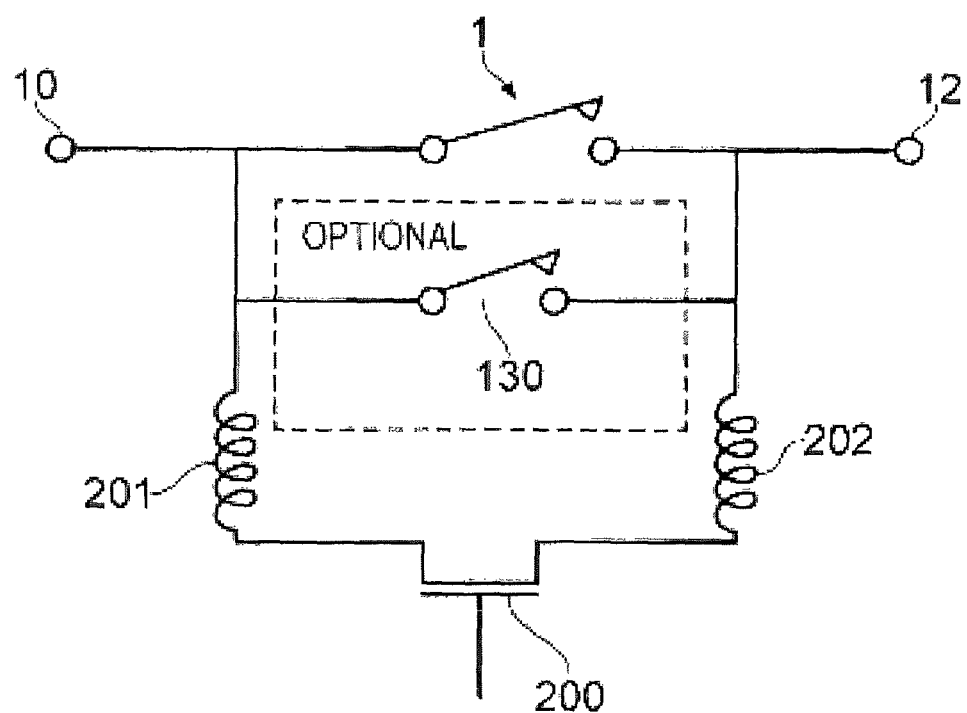
FIG. 10 shows a further embodiment of this disclosure.

FIG. 10 shows a further embodiment in which a semiconductor switch 200, shown here as a FET is connected in parallel with the switch 1, but has inductors 201 and 202 in series with it. The inductors 201 and 202 allow the transistor to provide a low impedance current flow path for DC and low frequency components whilst blocking the propagation of high frequency signals. This allows the transistor to equalize the voltage across switch 1, or at least do most of the work, before the MEMS switch 1 is operated. Optionally a second MEMS switch 130 may be provided in parallel with the switch 1. It can act as a further protection switch such that it is always closed when the switch 1 is switched between open and closed. This protects the contacts of switch 1 from damage, so that it keeps a low on resistance. Indeed in some circumstances it may be acceptable just to provide one or more protection MEMS switches 130 in parallel with the switch 1 such that one or more of the switches 130 are closed when switch 1 is operated. This keeps the contacts of switch 1 in good condition such that they provide a low on resistance. The or each additional switch 130 can also provide an additional signal path when switch 1 is closed. The MEMS switches 1 and 130 may be provided in an integrated circuit. The inductors 201 and 202, and the transistor 200 may be provided on chip or off chip.

Figure 11:
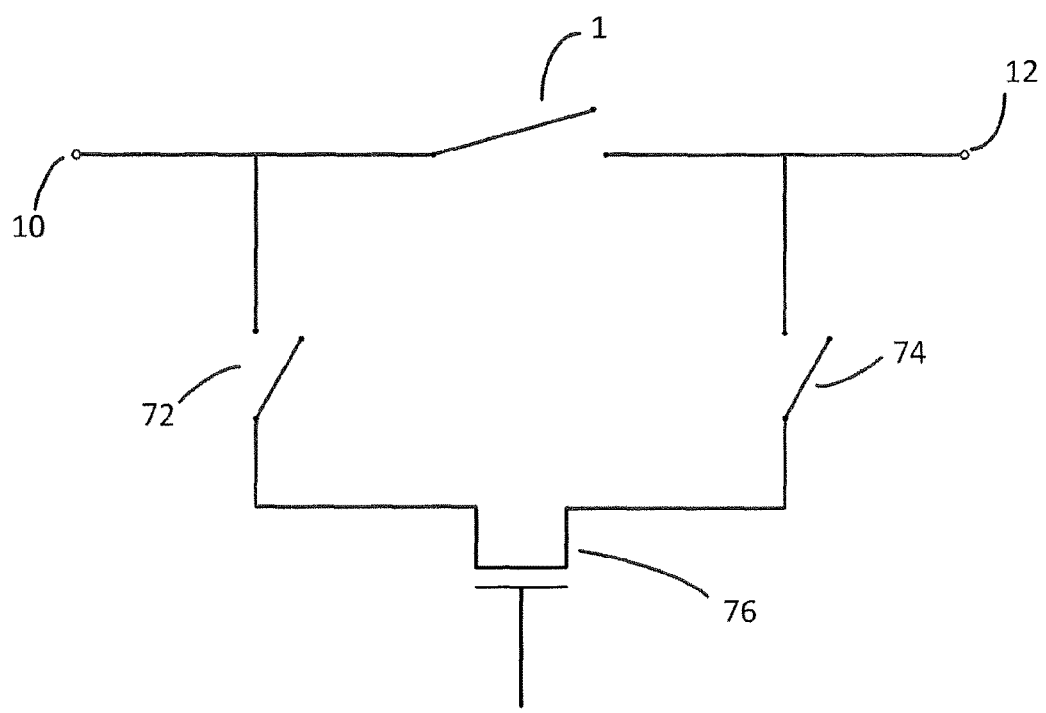
FIG. 11 shows a further embodiment of this disclosure.

FIG. 11 shows a further embodiment, which is based on the embodiment of FIG. 2 and where the resistors 85 and 95 have been omitted. This provides a simplified circuit.

Figure 12:
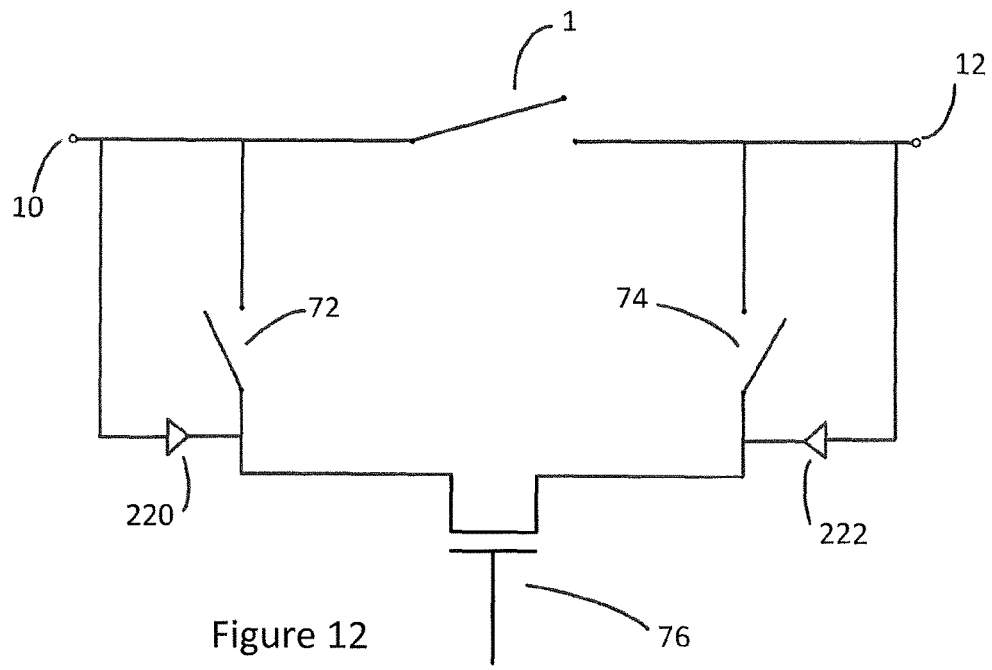
FIG. 12 shows another embodiment of this disclosure.

FIG. 12 shows a further variation, based on FIGS. 2 and 11, where amplifiers and/or voltage followers 220 and 222 have been introduced in parallel with the protection circuit MEMS switches 72 and 74 respectively. The amplifiers/voltage followers only need to be powered up just prior to closing the switches 72 and 74 (whilst transistor 76 is off). Consequently they only drive current to charge any parasitic capacitances associated with the switches 72 and 74, and can be made as very low power devices. The linearity, frequency response and offset of the amplifiers 220 and 222 is not particularly critical, and hence they need not consume much space or power.

Figure 13:
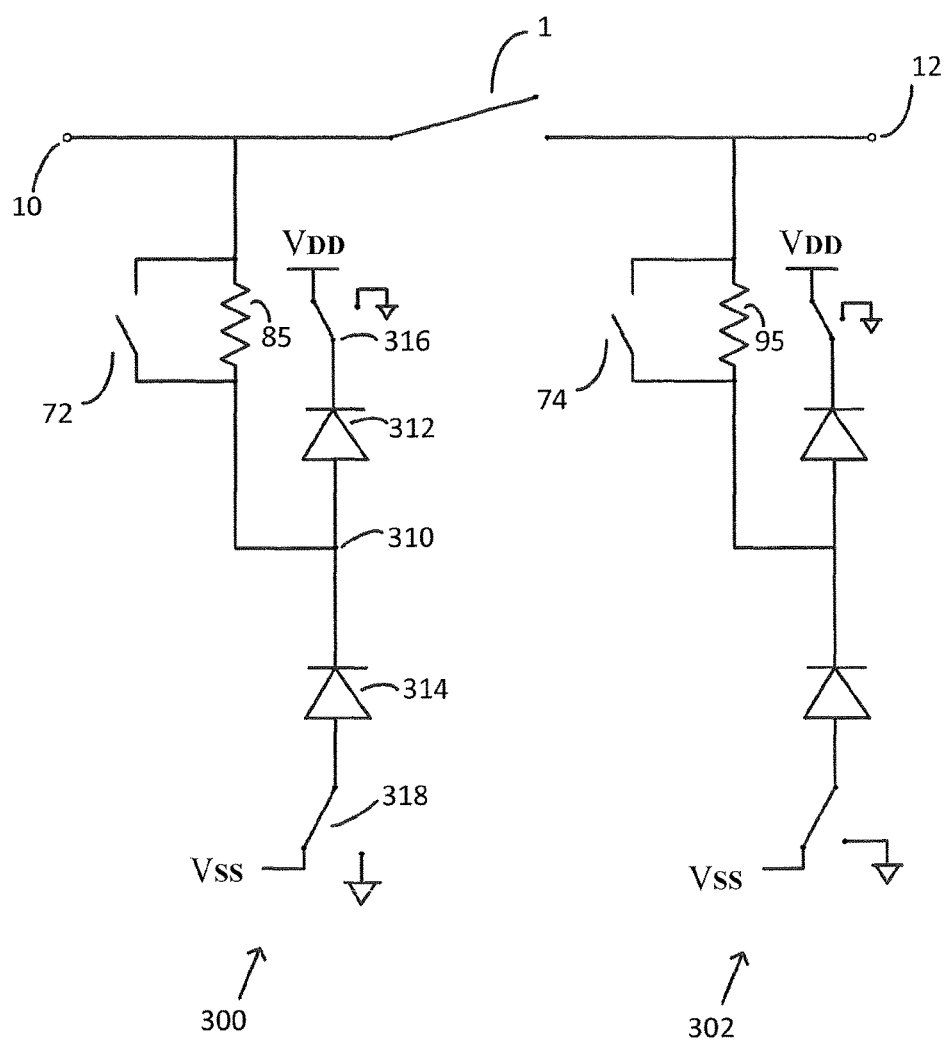
FIG. 13 shows a further embodiment using diodes to form a solid state switch.

FIG. 13 shows a further embodiment based on FIG. 4 where the protection switch 72 is interposed between node 10 and a circuit 300. Similarly switch 74 is interposed between node 12 and a circuit 302. The switches 72 and 74 may have resistors 85 and 95 in parallel with them, and these may be of relatively high values.

The circuits 300 and 302 are identical, and hence only the circuit 300 will be described in detail. A terminal of the protection switch 72 is connected to a node 310 which represents the cathode of a first diode 312 and the anode of a second diode 314. The anode of the first diode 312 is connected to a switch 316 operable to connect the anode to a positive supply $V_{DD}$ or to a local ground. The cathode of the second diode 314 is connected to a switch 318 operable to connect it to a negative supply $V_{SS}$ or local ground.

In use, both switches 72 and 74 are normally open, and the switches 316 and 318 connect to $V_{DD}$ and $V_{SS}$, respectively. When it is desired to open or close the switch 1, a switching sequence is commenced in which switches 72 and 74 are closed. Then the switches 316 and 318 are operated to connect their respective diodes to the local ground. This pulls node 310 to ground, or close to ground. The same sequence happens in circuit 302, so the voltage difference across the switch 1 is reduced to zero, or close to zero, volts. The switch 1 can then be opened or closed as appropriate. Once this has happened switches 316 and 318 are returned to their initial conditions so as to connect the diodes in a reverse biased configuration between $V_{DD}$ and $V_{SS}$. Then switches 72 and 74 are opened.

Figure 14:
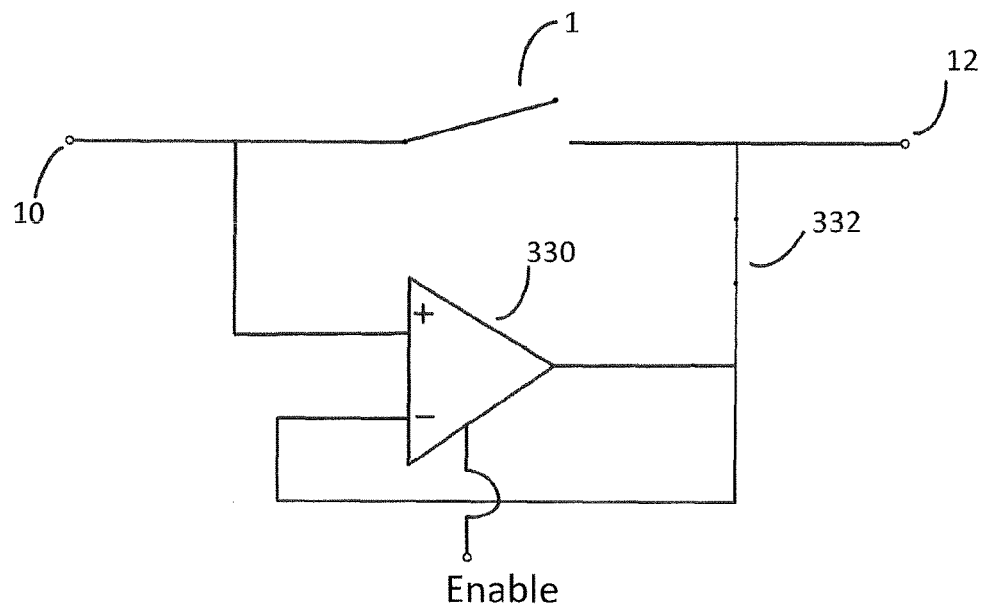
FIG. 14 shows an embodiment in which an amplifier is used to equalize potentials on either side of a switch.

FIG. 14 shows a variation that may be used in circumstances where the current passing through the switch can be supplied by a voltage follower 330. The voltage follower has an input connected to node 10 and an output connected to node 12, optionally by way of a switch 332. The voltage follower has an output stage that can be disabled, so as to place it in a high impedance state. In use and if switch 332 is provided, then normally switch 332 is open and the voltage follower is disabled, with its output high impedance. In a switching sequence, switch 332 can be closed so as to connect the output of the voltage follower to the node 12. The voltage follower can then be enabled, such that it forces the voltage at node 12 to match the voltage at node 10. Then the switch 1 can be opened or closed. Then the voltage follower can be disabled, and finally switch 332 opened.

A MEMS switch 1, and its protection circuit 70, are suitable for providing within integrated circuit packages. Several MEMS switches, and their associated protection circuits, may be provided within a single switch package configuration, either with or without additional electronics. The MEMS switches may be formed above a die which may be the same as the die carrying other components within the integrated circuit package, or may be a separate die in order to provide enhanced isolation. Where a separate die is chosen it need not be a semiconductor and may be another substrate, for example glass, chosen for its superior high impedance properties. Multiple dies may be provided within a single IC package as known to the person skilled in the art. In further variations, the additional protection switches or the shunting transistor need not be formed in the same package as the MEMS switch 1. However, it is advantageous that the MEMS switches 72 and 74 are provided in the same package at the MEMS switch 1, although the transistor 76 of FIG. 2, for example, could be provided as a separate component if so desired. Suitable low resistance semiconductor switches are commercially available, for example as component ADG1401 from Analog Devices. Such a switch has an on resistance of around 1 ohm.

The embodiments described herein have utility in many switching applications, where signal integrity and good isolation are required. MEMS switches can exhibit long operating lives and undergo millions of switch operations. Embodiments of the invention may be used, without limitation, in communication, monitoring and control systems.

Claims herein may be presented herein in single dependency format. However it is to be understood that each claim may multiply depend on any preceding claim of the same type provided that such an arrangement is not technically infeasible.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of protecting a switch having a first switch node and a second switch node, comprising:
   providing a shunt path in parallel with the switch, wherein the shunt path comprises a first resistor coupled to the first switch node, a second resistor coupled to the second switch node and a protection switch having a first terminal and a second terminal;
   coupling the first terminal to the first resistor; and
   coupling the second terminal to the second resistor.

2. A method as claimed in claim 1, in which the switch is a MEMS switch.

3. A method as claimed in claim 1, in which the protection switch comprises a MEMS switch.

4. A method as claimed in claim 1, wherein the protection switch comprises a solid state device and the method further comprises:
   providing a first MEMS switch coupled in parallel with the first resistor; and
   providing a second MEMS switch coupled in parallel with the second resistor.

5. A method as claimed in claim 1, wherein the first node is selectively connectable to a common node by way of a first node mechanical switch, and the second node is selectively connectable to the common node by way of a second node mechanical switch.

6. A method as claimed in claim 1, further comprising placing the shunt path in a low impedance state prior to switching of the switch.

7. A method as claimed in claim 4, in which the solid state device comprises a transistor or a diode.

8. A method of protecting a MEMS switch having a first switch node and a second switch node, comprising placing a shunt path in parallel with the MEMS switch, wherein the shunt path comprises a first shunt component coupled to the first switch node, a second shunt component coupled to the second switch node and a protection switch coupled to the first shunt component and the second shunt component, wherein the shunt path comprises at least one further MEMS switch.

9. A method as claimed in claim 8, where the at least one further MEMS switch is in parallel with the first shunt component, or in parallel with a circuit for reducing a potential difference across a respective further MEMS switch.

10. A method as claimed in claim 9, in which the first shunt component comprises a resistance.

11. A method as claimed in claim 8, in which the shunt path comprises at least one transistor switch in series with the at least one MEMS switch.

12. A MEMS switch having a first switch node and a second switch node, the MEMS switch arranged in combination with a protection circuit to selectively provide a low impedance path between the first and second switch nodes of the MEMS switch, the protection circuit comprising a first protection circuit MEMS switch, a second protection circuit MEMS switch, and a shunt component configured to limit the voltage across or the current through the first protection circuit MEMS switch around a switch transition of the first protection circuit MEMS switch,
   wherein the shunt component is in series or in parallel with the first protection circuit MEMS switch, and wherein the first protection circuit MEMS switch has a first node connected to the first switch node, and a second node connected to a first current flow node of a semiconductor device, and the second protection circuit MEMS switch has a first node connected to the second switch node and a second node connected to a second current flow node of the semiconductor device.

13. A MEMS switch having a first switch node and a second switch node, the MEMS switch arranged in combination with a protection circuit to selectively provide a low impedance path between the first and second switch nodes of the MEMS switch, the protection circuit comprising a first protection circuit MEMS switch, a second protection circuit MEMS switch, and a shunt component configured to limit the voltage across or the current through the first protection circuit MEMS switch around a switch transition of the first protection circuit MEMS switch,
   wherein the shunt component is in series or in parallel with the first protection circuit MEMS switch, and wherein the first protection circuit MEMS switch has a first node connected between the first switch node and a semiconductor switch or a semiconductor switch array, and the second protection circuit MEMS switch is connected between the second switch node and the semiconductor switch or the semiconductor switch array, and where the semiconductor switch or the semiconductor switch array is operable to connect the first and second protection circuit MEMS switches together or to a further node.

14. A MEMS switch as claimed in claim 13, in which the switch and the protection circuit are provided in a shared integrated circuit or chip package.

15. An integrated circuit comprising at least one MEMS switch as claimed in claim 13.

16. An integrated circuit as claimed in claim 15, in which the MEMS switch is formed on a first substrate and at least some components of the protection circuit are formed on a second substrate, and interconnections are made between nodes of the first and second substrates.

17. A MEMS switch as claimed in claim 13, further including a controller for controlling operation of the protection circuit and the MEMS switch.

18. A MEMS device comprising a first MEMS switch and a second MEMS switch, a shunt resistor connected in parallel with the second MEMS switch, and a control circuit for controlling the first and second MEMS switches such that the second MEMS switch is always closed when the first MEMS switch is switching between open and closed, wherein a terminal of the second MEMS switch is coupled to a diode.

19. A method of protecting a switch, comprising providing a shunt path in parallel with the switch, wherein the shunt path comprises
at least one solid state switch in series with a high stop filter comprising an inductor; or
an amplifier arranged to selectively reduce a potential difference across the switch.

20. A MEMS switch comprising a first switch node and a second switch node in association with a shunt path in parallel with the MEMS switch, wherein the shunt path comprises at least one solid state switch in series with a first inductor coupled to the first switch node and a second inductor coupled to the second switch node.

21. The MEMS switch as claimed in claim 13, wherein the shunt component is a resistor with a value of at least 1 MOhm.

22. The method as claimed in claim 8, further comprising:
controlling the at least one further MEMS switch to close from an open state while the MEMS switch is at an open state; and
subsequently controlling the MEMS switch to close.

23. The method as claimed in claim 8, further comprising:
selectively coupling the first shunt component to a ground plane or a signal line.

24. The method as claimed in claim 8, further comprising:
selectively matching a voltage at the first switch node with a voltage at the second switch node with an active circuit.

25. The method as claimed in claim 11, further comprising:
controlling the at least one further MEMS switch to close from an open state while the MEMS switch is at an open state;
subsequently controlling the at least one transistor switch to close from an open state; and
subsequently controlling the MEMS switch to close.

26. A circuit comprising the MEMS switch as claimed in claim 12, wherein the MEMS switch is a first MEMS switch, and the circuit further comprises:
a second MEMS switch having a third and fourth switch node, the second MEMS switch arranged in combination with a second protection circuit to selectively provide a low impedance path between the third and fourth switch nodes of the MEMS switch, wherein
the first node of the second protection circuit MEMS switch is connected to the third switch node.

27. The MEMS device as claimed in claim 18, wherein the diode is configured to be selectively connected to ground when the second MEMS switch is closed.

28. The method as claimed in claim 19, wherein the shunt path comprises an amplifier, and the method further comprises:
connecting an input of a voltage follower with a first node of the switch;
connecting an output of the voltage follower with a second node of the switch;
selectively controlling the voltage follower to match a voltage at the first node with a voltage at the second node around a switch transition of the switch.

29. The MEMS switch as claimed in claim 20, wherein the MEMS switch is coupled in parallel with a MEMS protection switch.

30. The MEMS switch as claimed in claim 14, wherein the semiconductor switch or the semiconductor switch array is outside a chip package for the switch.

31. A MEMS switch as claimed in claim 13, in which the first protection circuit MEMS switch is in series with a resistor.

32. A MEMS switch as claimed in claim 13, in which the protection circuit has a shunt.

33. A MEMS switch as claimed in claim 12, in which the first protection circuit MEMS switch is in series with the semiconductor device.

* * * * *